United States Patent [19]

Vezirian

[11] Patent Number: 4,744,270

[45] Date of Patent: May 17, 1988

[54] METHOD FOR THERMALLY FITTING HARD TEETH IN ROCK BITS

[76] Inventor: Edward Vezirian, 110 Firwood, Irvine, Calif. 92714

[21] Appl. No.: 65,049

[22] Filed: Jun. 19, 1987

[51] Int. Cl.$^4$ ............................................... B21K 5/02
[52] U.S. Cl. ..................................... 76/108 A; 29/447
[58] Field of Search ............. 76/108 R, 108 A, 101 R, 76/101 E, DIG. 11, DIG. 12; 29/447, 800

[56] References Cited

U.S. PATENT DOCUMENTS 4,452,325  6/1984  Radd et al. ............................. 29/447

Primary Examiner—Roscoe V. Parker

[57] ABSTRACT

A method of securing hard-metal, insert type, rock cutting teeth into the supporting structures of rock bits is described, wherein the thermal expansion characteristics of the materials of the supporting structure, and of the hard-metal teeth, with widely differential temperatures, are relied upon to relatively enlarge the dimensions of undersized retention bores formed by and within the supporting structure with respect to the dimensions of insertable rock cutting teeth, thus permitting insertion of the rock cutting teeth into the undersized retention bores. Subsequent equalization of the temperature of the assembly will tightly retain such teeth within the retention bores.

5 Claims, No Drawings 4,744,270

METHOD FOR THERMALLY FITTING HARD TEETH IN ROCK BITS

FIELD OF THE INVENTION

This invention pertains to the method used to install and retain hard-metal rock cutting teeth within undersized retaining bores formed by and within the supporting structures of rock bits.

More specifically, this method pertains to the use of, and reliance upon, the thermal expansion properties of the materials of construction of the rock bit and of the rock cutting teeth at widely differential temperatures, to implement the installation of the rock cutting teeth into undersized retention bores formed by and within the supporting structures of rock bits, and, subsequently, the same thermal expansion properties, at mutually uniform temperatures, to securely retain the inserted rock cutting teeth within the same undersized retention bores.

BACKGROUND OF THE INVENTION

Rock cutting structures found in the prior art are commercially manufactured using a supporting structure which is formed by either casting or forging, and then is machined, and which is designed to support at least one rock cutting tooth, which tooth may be formed either as an integral part of the supporting structure, or as a separate detail which is pre-formed of a premium hard material and is designed to be joined to the supporting structure by being forced into an undersized retaining bore formed by and within the supporting structure to effect a tight interference fit therewith.

Various sequencing and scheduling strategies are resorted to in manufacturing in order to avoid heat treatments after the teeth are pressed into place, to avoid thermal relaxation of the induced stresses provided by the pressing operation. Such a reduction of induced stresses would result in an unacceptable reduction in the retention or holding force provided by the interference fitting operation.

The steels commonly used to produce rock bit cutting structures are graded which carburize or nitride readily, thus providing a relatively soft core with a hard wear resistant skin. To form this hard skin on the inner surface of the retention bores would seriously interfere with the installation of the teeth therein, and so generally the supporting structure is first carburized, then the carburized surface is machined away in the locations intended for retention bores, then heat treat hardened before the retention bores are machined.

The conventional three-cone rotary rock bit has, typically, from about 100 to about 300 inserted teeth, each of which is carefully selective fit to provide about 0.004 inch interference fit. Tests indicate that about 0.001 inch interference fit remains as stored stress within the assembly after the pressing, the rest being lost to shearing, galling, and yielding of the steel of the supporting structure.

The irregular heavy impact loads imposed upon the rock bit assembly during drilling tend to cause further yielding in the supporting structure with the subsequent enlargement of retaining bores, and, occasionally, the resultant loss of hard-metal rock cutting teeth within the well bore. Such a lost tooth is no longer operational as a cutting device against the rock, but does constitute a source of considerable damage or fracture to the remaining teeth in the rock bit. Serious damage can also occur as a result of a dislodged tooth becoming jammed between cones, or between a cone and the body of the rock bit, thereby interfering with the rotation and cutting action of the cones involved, and of the bit. When cone rotation ceases, a skidding action occurs between the well bore bottom and the cone or cones, a stopped cone quickly causes self-destruction of the cutting apparatus.

Additionally, such dislodged teeth, if left remaining loose in the bottom of a well bore, and not embedded in the well bore wall, present an equally destructive potential against fresh new rock bits introduced into the same well bore, consequently, it is all too frequently required to expend much time, effort, and a great deal of expense to "fish" debris from the remote well bore bottom in order to permit continued drilling activity, and thus to save the bore already accomplished.

The time and labor involved in raising and disassembling the drill line from a deep well, and then reversing the process to assemble and lower the drill line into the well again, is indeed a major expense item in an already monumentally expensive venture. This unwelcome procedure is required every time a rock bit must be changed, or debris must be "fished" from bore bottom. Anything that can be done to help avoid or to postpone a "trip" out of and back into a well bore, must be done, in the interest of survival in this high stakes endeavor.

Existing evidence indicates that the heavy hydraulic applied load applied to an insert type rock bit tooth for the purpose of forcing it into the retaining bore provided is sometimes instrumental in producing internal micro-cracking in the subject tooth resulting in the subsequent early failure of that tooth in service. Only by eliminating the pressing operation can the loss of inserts in service due to installation damage be eliminated.

BRIEF DESCRIPTION OF THE INVENTION

An object of this invention is to provide a method whereby the amount of effective retained interference fit obtained between rock bit tooth and supporting structure is increased beyond that obtained by press fitting methods. No metal is cut in this process. A full faying surface is produced between the grip length of the insert tooth and the retention bore, even if the grip length of the tooth has not been centerless ground. The only displacements of metal are those caused thermally along natural metallurgical boundaries.

Another object of this invention is to prevent metal shavings, produced by shearing the tooth into the undersized retention bore, from being trapped between the inserted tooth and the bottom of the tooth retaining bore of the supporting structure. The press fit process inherently results in a shearing action between the hard-metal insert tooth and the structure material defining the retention bore. The retention bore walls of the support structure not only experience shearing, but galling as well, due to being much softer than the hard insert tooth. Shearing and galling of the walls of the retention bore produce non-uniform voids between the cylindrical inserted "grip length" of the insert tooth and the walls of the retention bore. Such voids and other irregularities of contact therebetween result in an unpredictable, non-uniform level of retention. The metal removed from the wall of the retention bore by shearing and galling is driven to the bottom of the retention bore and serves to shim the inserted tooth off of the bottom of the retention bore, thus upsetting the relationship between grip length and protrusion length of the insert tooth which was designed into the product. The resulting increase in protrusion length, as well as the resulting reduction in grip length, both serve bilaterally to reduce the effective retention strength of the assembly.

Yet another object of this invention is to provide a method of interference fitting inserted teeth into rock bit supporting structures without subjecting such teeth to potential damage from high tonnage pressing forces used to install the insert tooth into the retention bore.

A rock bit supporting structure is prepared for the insertion of hard-metal teeth into undersized retention bores formed in and by the supporting structure in the conventional manner. The heat treat history is completed for all cycles involving temperatures approaching or surpassing the annealing point.

The support structure is brought to a predetermined first higher relative temperature and stabilized. This temperature may be as high as a temperature specified for a final heat treatment, such as tempering or age hardening.

The individual rock cutting teeth are provided stabilized to a second predetermined lower relative temperature. The two temperatures along with the thermal expansion rates of the materials involved have been calculated to provide the proper clearance for assembly, and the proper interference fit after the equalization of the temperature of the assembly.

Within the heat treat oven, each relatively cold insert tooth is quickly slip fit into its respective undersized retention bore, with the aid of tooling which maintains the orientation of the tooth and isolates the operator from the hot environment. The tooth is held in place and allowed to thermally expand to provide an ongoing interference fit with the retention bore. The process is repeated to place and retain all the required insert teeth.

Any pending final heat treat cycle may be carried to completion, after all the teeth have been installed.

By regulating the relative differential temperatures of the support structure and of the insert tooth, a nominal interference fit can be selected. Heat treat specifications control the maximum temperature of the support structure, but the temperature of the insert tooth can be controlled over a wide range to regulate the interference fit expected. Since no material is sheared or galled from the retention bore walls in the fitting operation, the final interference fit obtained can be more accurately predicted. A full faying surface is generated between the grip length of the insert and the retention bore wall to yield a maximum retentive grip on the insert for the interference fit allowed.

An advantage of this invention is that a more uniform effective grip length is maintained with the undersized retention bore wall, and similarly a more uniform protrusion length from the surface of the supporting structure is maintained, providing both a more predictable retention grip strength and a more predictable opposing force of interaction with the rock face at bore hole bottom.

The features of the present invention, which are believed to be novel, are set forth with particularity in the appended claims. The present invention, both as to its organization and manner of operation, together with the further advantages thereof, may better be understood by reference to the following description.

DESCRIPTION OF THE PREFERRED METHOD FOR CARRYING OUT THE INVENTION

A support structure is conventionally prepared to include forming, machining, production of undersized tooth retention bores therein by precision boring, and all of the heat treat procedures involving temperatures over about 1000 degrees F.

The support structure is then stabilized at a predetermined temperature, not to exceed the temperature of any final heat treat step, such as tempering or age hardening.

Individual, pre-formed, insert type, hard, rock cutting teeth are stabilized at a predetermined temperature sufficiently less than the predetermined temperature of the supporting structure to provide for non-interference fitting of the individual rock cutting teeth into appropriate retention bores formed by and within the temperature stabilized supporting structure. These calculations also provide for the predetermined interference fit that is to exist when the insert teeth and the supporting structure share a common temperature.

Each individual rock cutting tooth is then oriented and fit into its appropriate undersized retention bore within the supporting structure, and held in place while the temperature of the individual rock cutting tooth rises sufficiently to fit in interference with the retention bore. This process is repeated until the full complement of rock cutting teeth have been so fit into place.

Any pending prescribed low temperature heat treat cycle may then be completed. For the purposes of this discussion, "low temperature heat treat" is considered to refer to cycles not exceeding about 1000 degrees F.

The rock cutting teeth are retained at the stabilized supporting structure temperature, due to the thermal expansion of the individual rock cutting teeth as the temperature differential between the supporting structure and the individual rock cutting teeth decreases substantially to nothing, and the temperature of the assembly becomes stabilized.

The retention strength of the individual rock cutting teeth within the assembly will increase as the temperature of the assembly is reduced to temperatures lower than the stabilized temperature of the supporting structure, due to the rate of thermal expansion of the material of the supporting structure being about twice the rate of thermal expansion of the material of the individual rock cutting teeth. The normal operating temperatures of rock bits may be substantially lower than the final installation temperatures employed.

It should be obvious that cryogenic or refrigeration practices may be used in the temperature stabilization of the hard teeth in the practice of this invention.

However, the use of cryogenic temperature treatments to improve ductility of the supporting structure, a practice much cited in the recent literature, is not presently considered to be advantageous when used in conjunction with the method herein described. Because the rate of thermal expansion of the material of the supporting structure exceeds the rate of thermal expansion of the material of the individual rock cutting teeth by a factor of about two, such a cryogenic treatment would serve to relieve the retention grip of the supporting structure upon the individual rock cutting teeth through physical displacements in the crystal structure of the supporting structure during such cryogenic treatment. Therefore such cryogenic treatments would appear to be very counter-productive in the practice of the instant invention.

Given the differential temperatures available within the constraints of the herein described process, and the rate of thermal expansion characterized by the normal materials of construction of rock bits, interference fits well in excess of those normally practiced in press fit operations may be practiced as herein described. Furthermore, the losses of fit interference from stress relief, normally encountered with differential thermal fitting, are not as severe as are the additional losses encountered in the shearing and galling associated with press fitting.

Therefore, an overall increase in tooth retention grip strength may be expected to proceed from the practice of this invention.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What I claim is:

1. A method of installing individual hard, insert type, rock cutting teeth into appropriate undersized retention bores formed by and within a supporting structure of a rock bit, and securely retaining said teeth within said undersized retention bores formed by and within said rock bit comprising:

preparing said supporting structure of said rock bit by forming, machining, providing said undersized retention bores, and heat treating through all prescribed heat treat cycles exceeding about 1000 degrees F., providing said supporting structure at a stabilized first, relatively higher temperature, said first relatively higher temperature not to exceed prescribed temperature of remaining heat treat cycle, providing said individual, hard, insert type, rock cutting teeth at a stabilized second, relatively lower temperature, said second, relatively lower temperature being a predetermined amount lower than said first, relatively higher temperature, orienting and inserting each said individual rock cutting tooth into said appropriate undersized retention bore formed by and within said supporting structure of said rock bit, and holding each said insert in place allowing its temperature to stabilize upward providing an interference fit thereto.

2. The invention as described in claim 1 wherein said stabilized first, relatively higher temperature is provided as a part of a prescribed heat treat tempering cycle.

3. The invention as described in claim 1 wherein said stabilized first, relatively higher temperature is provided as a part of a prescribed heat treat age hardening cycle.

4. The invention as described in claim 1 wherein said stabilized second, relatively lower temperature is provided cryogenically.

5. The invention as described in claim 1 wherein said stabilized second, relatively lower temperature is provided by refrigeration.

* * * * *